United States Patent [19]

Lii

[11] Patent Number: 4,577,374
[45] Date of Patent: Mar. 25, 1986

[54] SNAP HOOK AND BUCKLE

[76] Inventor: Huei J. Lii, No. 8, Lane 46, Chung Teh Pa St., Tainan, Taiwan

[21] Appl. No.: 677,805

[22] Filed: Dec. 4, 1984

[51] Int. Cl.⁴ ............................................. A44B 11/00
[52] U.S. Cl. ....................................... 24/165; 24/185; 24/265 H; 24/265 AL; 24/615
[58] Field of Search ............ 24/165, 185, 199, 241 PL, 24/265 R, 265 BC, 265 EC, 265 H, 265 AL, 265 EE, DIG. 28, 615, 598, 589

[56] References Cited

U.S. PATENT DOCUMENTS

| 339,039 | 3/1886 | Bernd | 24/265 H |
|---|---|---|---|
| 760,171 | 5/1904 | Atwell | 24/165 |
| 924,104 | 6/1909 | Powell | 24/615 |
| 1,484,557 | 2/1924 | Latham | 24/165 |
| 1,767,368 | 6/1930 | Jensen | 24/165 |
| 2,746,116 | 5/1956 | Craven | 24/265 AL |
| 3,065,513 | 11/1962 | Warner et al. | 24/265 AL |

FOREIGN PATENT DOCUMENTS

| 986310 | 7/1951 | France | 24/265 R |
|---|---|---|---|
| 341345 | 1/1931 | United Kingdom | 24/165 |

Primary Examiner—Victor N. Sakran

[57] ABSTRACT

An elastic buckle construction which is comprised of a base which has a bore at its top side and a throughhole passing through from one side to another side of the bore, an engaging ring of a circular shape which has a tapered annular wall surface at its inner side and which is adapted to be received in the throughhole, a buckle body which has an engaging rod of disuniform cross-section for insertion into the bore and an engaging plate directly molded on its one side, whereby the base and the buckle body are firmly interconnected when the engaging rod of the buckle body is inserted into the bore and the engaging ring clamps the engaging rod.

1 Claim, 6 Drawing Figures

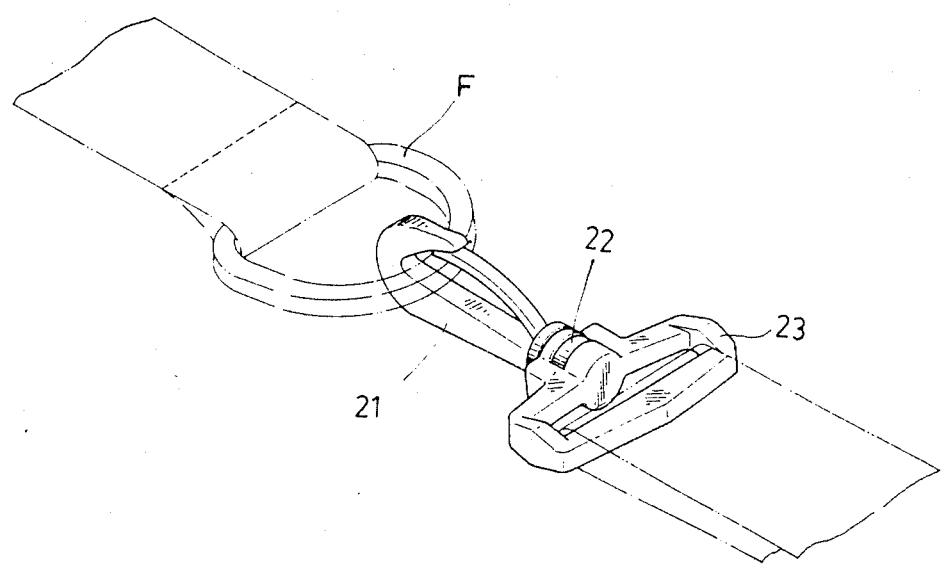
F I G. 4
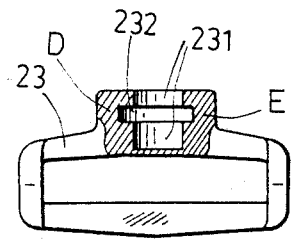
F I G. 6

SNAP HOOK AND BUCKLE

BACKGROUND OF THE INVENTION

This invention relates to an elastic buckle construction, particularly to an elastic buckle of simplified construction.

A known elastic buckle used for fastening things is typically comprised of, as shown in FIGS. 1 and 2, a buckle body 11 and a base 12. The body 11 before it is assembled has a bottom end formed into a projecting rod 111 of uniform diameter, and it is incorporated with an engaging member 112 formed by bending which posesses a measure of elasticity. The top end of the base 12 is provided with a throughhole 121 of greater inside diameter. In assembly, the projecting rod 111 of the body 11 is threaded through the throughole 121, and the bottom end of the rod 111 is then deformed by press working so that its radius is greater than that of the throughhole, thereby coupling the body 11 and the base 12 to form a complete buckle 10 in which the body 11 is freely rotatable. When it is in use, one may depress the engaging member 112 and make the body 11 to hook a semicircle-shaped member A (it is a known element and therefore is not detailed herein), as shown in FIG. 2. Then the fastening member 112 is allowed to spring back to abut against one end of the body 11. The above elastic buckle 10 is a known construction, but it is necessary to fabricate it by press working which complicates manufacturing, and furthermore, the formation of the fastening member 112 by bending involves an additional processing step. To this end, the inventor has attempted to make an improvement to simplify the manufacture.

SUMMARY OF THE INVENTION

An object of the invention is to provide a buckle which is different in construction from the conventional buckle and can be constructed by a simplified process.

Another object of the invention is to provide an elastic buckle of novel construction which is attractive to the consumers and also is a popular product.

To achieve the above-mentioned object, the technique utilized in the invention and its advantages will be described by an exemplary preferred embodiment with reference to the accompanying drawings.

BRIEF DESCRIPTION OF THE DRAWINGS

FIG. 4 is a view illustrating the embodiment which is in use;

FIG. 6 is a partially sectioned view of a base.

DETAILED DESCRIPTION OF THE PREFERRED EMBODIMENT

Figure 1:
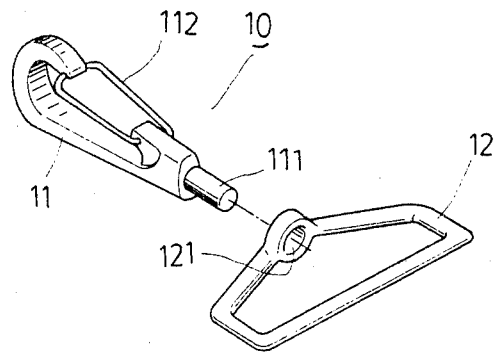
FIG. 1 is an exploded view of a known buckle.
Figure 2:
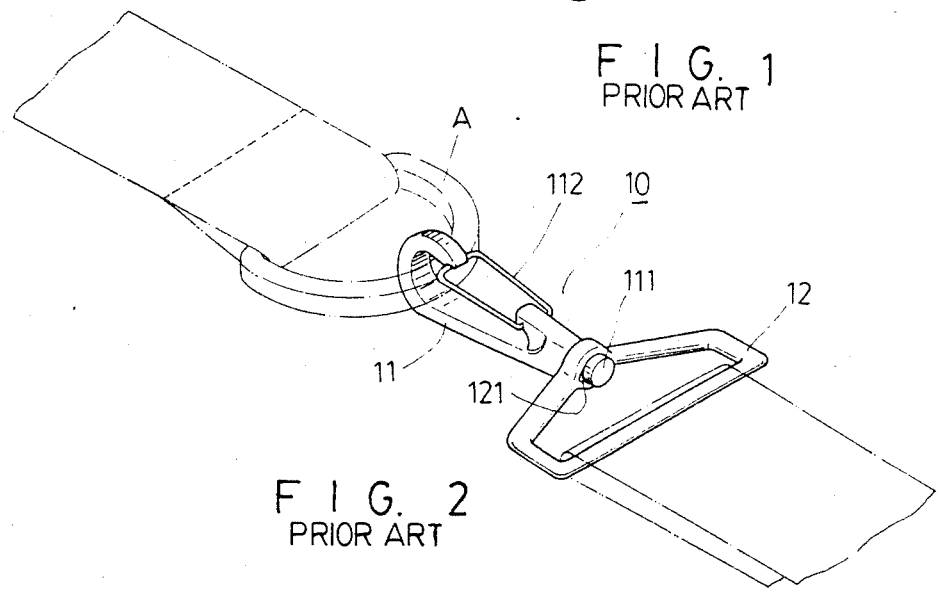
FIG. 2 is a view illustrating the known buckle which is in use.
Figures 3, 5:
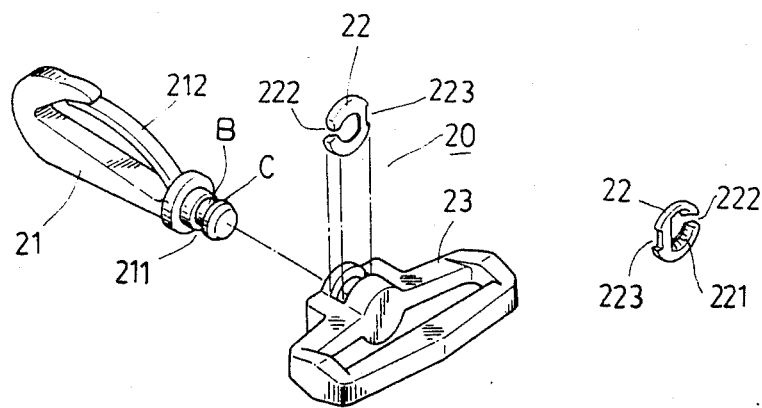
FIG. 3 is an exploded view of a preferred embodiment.
FIG. 5 is a perspective view of an engaging ring of the embodiment.

Referring to the drawings, FIG. 3 is an exploded view of a preferred embodiment, FIG. 4 is a perspective view of the embodiment after assembled, FIG. 5 is a perspective view of the ring, and FIG. 6 is a sectioned view of the base. The embodiment is an elastic buckle 20 which includes a buckle body 21, an engaging ring 22 and a base 23, wherein the bottom end of the buckle body 21 is formed into a rod 211 which has a contracted upper portion and an enlarged lower portion (the portion with contracted diameter is designated by B in FIG. 3 and the portion with enlarged diameter is designated by C), and the front side of the buckle body 21 is directly formed into an engaging plate 212. Since it is preferably made of a plastic material, the engaging plate 212 which is directly formed on the molded buckle body 21 offers an excellent elasticity. When the engaging plate 212 is depressed inward, it deflects inward and the buckle body 21 is put into its opened position. When it is released, it will spring back and the buckle body 21 is put into its closed position. Since the engaging plate 212 is formed on the buckle body 21, it does not require a process to construct it by bending and to fit it into the buckle body as in the case of the conventional buckle. Apparently the construction, according to the invention, is simplified.

The engaging ring 22 is in the shape of a ring of which the inside diameter is substantially equal to the contracted portion (designated by B in FIG. 3) of the engaging rod 211 of the buckle body 21. The inner side of the ring 22 has a tapered annular wall surface 221 as shown in FIG. 5. One side of the ring 22 is provided with a cut 222 and another side of the ring 22 is provided with a recess 223. The top end of the base 23 has a bore 231 and a throughhole 232 passing through the bore 231 from one side to the other side as shown in FIG. 6, for receiving the engaging ring 22.

In assembling, the engaging ring 22 is put into the through hole 232 in such a manner that the tapered surface 221 is directed upward and the cut 222 and the recess 223 are directed to the left and the right respectively. The cut 222 faces toward a post designated by D in FIG. 6 at one side of the bore 231 and the recess 223 faces toward another post designated by E in FIG. 6 at another side of the bore 231. The recess 223 is engaged with the post E. When the engaging rod 211 of the buckle body 21 is inserted into the bore 231, the enlarged portion (designated by C in FIG. 3) of the engaging rod 211 is abutted against the tapered surface 221 of the engaging ring 22. Upon exertion of a pressure, the engaging rod 211 is moved downward subsequently, forcing the engaging ring 22 to stretch out for the admission of the engaging rod 211. The engaging rod 211 is moved downward until the contracted portion (as designated by B in FIG. 3) meets the engaging ring 22. The engaging ring 22 after stretching out returns to its normal condition and clamps the contracted portion of the engaging rod 211, thereby completing the assembly of the buckle 20. At this time, if the buckle body 21 is drawn outward (i.e. to separate the buckle body 21 from the base 23), the buckle body 21 can not come out due to the clamping action of the engaging ring 22. Furthermore, the engaging ring 22 can not be removed because of its engagement with the engaging rod 211. With this interengagement, the buckle body 21, the engaging ring 22 and the base 23 are formed into a complete buckle 20.

When the buckle is in use as shown in FIG. 4, the engaging plate 212 is depressed to let the buckle body 21 hook up to a ring body F (known element) and then is released to place the buckle in its closed position.

As mentioned above, the buckle body 21, the engaging ring 22 and the base 23 are made by molding and are assembled into a complete buckle without subjecting to processes such as bending and press working. Therefore, the manufacturing process according to the present invention is easier than the process for manufacturing the known elastic buckle. The construction of the buckle in this invention is novel and offers a greater commercial value.

With the invention thus explained, it is apparent that various modifications and variations can be made without deparing from the scope of the invention. It is therefore intended that the invention be limited as indicated in the appended claims.

I claim:

1. An elastic buckle construction comprising:
 a base having a bore at its top end and a throughhole transversely passing from one side to another side of the bore;
 an engaging ring having a cut on its one side, a recess on its other side, and a tapered annular wall surface at its inner side, the engaging ring being received in the throughhole of the base; and
 a buckle body having, at its bottom side, an engaging rod which is contracted at its upper portion and is enlarged at it lower portion and which has a tapered end to facilitate the insertion of the engaging rod into the bore;
 whereby, when the engaging rod of the buckle body is inserted in the bore and its contracted portion is clamped by the engaging ring, the base and the buckle body can be coupled into a buckle.

* * * * *